United States Patent
Romano et al.

(10) Patent No.: US 6,661,805 B1
(45) Date of Patent: Dec. 9, 2003

(54) SYSTEM AND METHOD FOR AUTOMATICALLY CHANGING A DEVICE TRANSMIT/RECEIVE CONFIGURATION

(75) Inventors: Pasquale Romano, San Jose, CA (US); James Randall Turner, San Jose, CA (US); Bradley Kayton, San Jose, CA (US)

(73) Assignee: 2Wire, Inc., San Jose, CA (US)

( * ) Notice: Subject to any disclaimer, the term of this patent is extended or adjusted under 35 U.S.C. 154(b) by 0 days.

(21) Appl. No.: 09/436,816

(22) Filed: Nov. 9, 1999

(51) Int. Cl.⁷ .......................... G06F 13/00; H04L 12/26

(52) U.S. Cl. ....................................... 370/450

(58) Field of Search ................. 370/216, 217, 370/254, 431, 445, 449, 450; 709/200, 220, 227, 250

(56) References Cited

U.S. PATENT DOCUMENTS

| | | | |
|---|---|---|---|
| 5,577,023 A | * 11/1996 | Marum et al. | 370/225 |
| 5,671,355 A | * 9/1997 | Collins | 709/250 |
| 5,923,663 A | * 7/1999 | Bontemps et al. | 370/445 |
| 6,059,583 A | * 5/2000 | Croft et al. | 439/131 |
| 6,175,865 B1 | * 1/2001 | Dove et al. | 709/220 |
| 6,509,659 B1 | * 1/2003 | Carroll et al. | 307/125 |

OTHER PUBLICATIONS

Crayford. "Fast Ethernet' Gets Plug–and–Play". IEEE WESCOM/'95 Conference. Nov. 7, 1995–Nov. 9, 1995. pp. 354–359.*

* cited by examiner

Primary Examiner—Chi Pham
Assistant Examiner—Derrick W Ferris
(74) Attorney, Agent, or Firm—Blakely, Sokoloff, Taylor & Zafman LLP

(57) ABSTRACT

A system and method are disclosed for automatically configuring an Ethernet device as either an Ethernet end station or as an Ethernet hub to permit the Ethernet device to be coupled to another Ethernet device regardless of whether the Ethernet devices are Ethernet end stations or Ethernet hubs and regardless of whether a straight-through or crossover cable is used to interconnect the Ethernet devices. According to one embodiment, a control device is disposed between an Ethernet device physical layer and a connector for periodically reversing a transmit/receive configuration of the device until an Ethernet link is established. More particularly, a plurality of multiplexers are positioned in front of the Ethernet physical layer to switch between transmit and receive leads of the same polarity to selectively reverse the transmit/receive configuration of the associated Ethernet device. In operation, the transmit/receive configuration of and Ethernet device is positioned in a default, or initial, setting. Next, a controller determines whether an Ethernet link is present between the Ethernet device and another Ethernet device. If no Ethernet link is established, the controller periodically reverses the transmit/receive configuration of the Ethernet device until detecting the presence of an Ethernet link.

23 Claims, 3 Drawing Sheets

SYSTEM AND METHOD FOR AUTOMATICALLY CHANGING A DEVICE TRANSMIT/RECEIVE CONFIGURATION

BACKGROUND OF THE INVENTION

1. Field of the Invention

This invention relates generally to interconnecting computers and peripheral devices and, more particularly, to a system and method for automatically changing a transmit/receive configuration a computer, peripheral device, or both to establish a link between multiple devices.

2. Description of Related Art

Over the past several years, personal computers and peripheral devices have become commonplace. The vast majority of business offices have personal computers in them, and the use of personal computers in homes is growing rapidly as well. Most offices, and many homes, have more than one personal computer and it is often desirable to interconnect these computers or to utilize one printer or other peripheral device with more than one personal computer.

It is well known that Local Area Networks (LANs) can be established in these locations to network computers and to allow more than one computer to access such peripheral devices. In general, LANs connect a community of devices such as personal computers, servers, microcomputers, workstations, and printers in a localized area. One objective of some LANs is to allow multiple users to share peripherals, including printers and shared storage. Another objective is the sharing of files and applications between computers.

Today, local area networking is a shared access technology. This means that the devices attached to the LAN share a single communications medium, usually a co-axial twisted pair cable, or fiber-optic cable, for example. A widely used LAN technology in use today is Ethernet. The Institute of Electrical and Electronics Engineers (IEEE) defines and describes the Ethernet standard in a specification commonly known as IEEE 802.3, which is incorporated herein by reference.

In general, an Ethernet connection typically includes two pairs of unshielded twisted pair wires, a total of four wires. One pair of wires is called the transmit pair (Tx+ and Tx−) and the other pair is called the receive pair (Rx+ and Rx−). Because Ethernet end stations and Ethernet hubs frequently use opposite pairs to transmit and receive, an Ethernet end station and an Ethernet hub may be interconnected with a standard "straight-through" Ethernet cable to align respective transmit and receive locations. A straight-through Ethernet cable connects transmit pins at one end of the cable with transmit pins at the other end of the cable, as well as connecting receive pins at one end of the cable with receive pins at the other end of the cable.

Conventionally, however, a "crossover" cable must be used to directly interconnect an Ethernet end station and another Ethernet end station, or to directly connect an Ethernet hub to another Ethernet hub so that the various transmit and receive signals are sent to the appropriate locations. A crossover cable interconnects the pins used as the transmit pair at one end of the cable with the pins used as the receive pair at the other end of the cable and vice versa.

Hence, in some Ethernet connections, a straight-through cable is required, while in other Ethernet connections, a crossover cable is required. Unfortunately, particularly for lay users, determining whether to use a straight-through cable or a crossover cable may be confusing, which could lead to a failure to install the correct cable. Using the wrong cable will, conventionally, result in an unsuccessful Ethernet connection.

Consequently, a need exists for a system and method by which transmit and receive connector components of a device may be automatically reconfigured to achieve a link with another device. An additional need exists to provide a system and method for reliably configuring an Ethernet connection regardless of the type of Ethernet appliance (hub or end station) or the type of cable (straight-through or crossover) employed.

SUMMARY OF THE INVENTION

The present invention relates to a system and method by which device transmit and receive connector components are automatically configured to establish a link. In general, the present invention provides a multiplexer associated with each of a plurality of leads, or outputs, and having either a software or a hardware entity monitor a link indicator and automatically switch the multiplexers as needed to establish or maintain a link. Thus, the multiplexers switch the connector configuration until a link is established.

In one embodiment, the invention comprises a first Ethernet device for generating data to be transmitted across a transmission network system. The first Ethernet device includes a first physical layer for preparing the data for transmission. A second Ethernet device is also coupled to the transmission network system for receiving data from the transmission network and includes a second physical layer for receiving the data. An auto-configuration device is coupled to the first physical layer for detecting the existence of an Ethernet link and switching the line configuration to another configuration until detecting an Ethernet link.

The auto-configuration device may comprise a multiplexer circuit for switching the line configuration to a different line configuration until receiving a "link established" signal. An auto-configuration controller monitors the status of the link, which may comprise an Ethernet link, and controls the multiplexers according to the status of the link.

One embodiment of the present invention provides a method for automatically configuring a transmit/receive configuration of a device connector. The method includes detecting whether a link is present between first and second devices, switching a transmit/receive configuration of the first device from a first configuration to a second configuration if no link is detected, then periodically continuing to execute the steps of detecting and switching until detecting a link. Preferably, the time period of the transmit/receive configuration switching is at least as long as a minimum settle time to permit the associated components sufficient time to settle. To prevent a deadlock between two devices including auto configuration devices, the period length may be randomized.

DETAILED DESCRIPTION OF THE DRAWINGS

Figure 1:
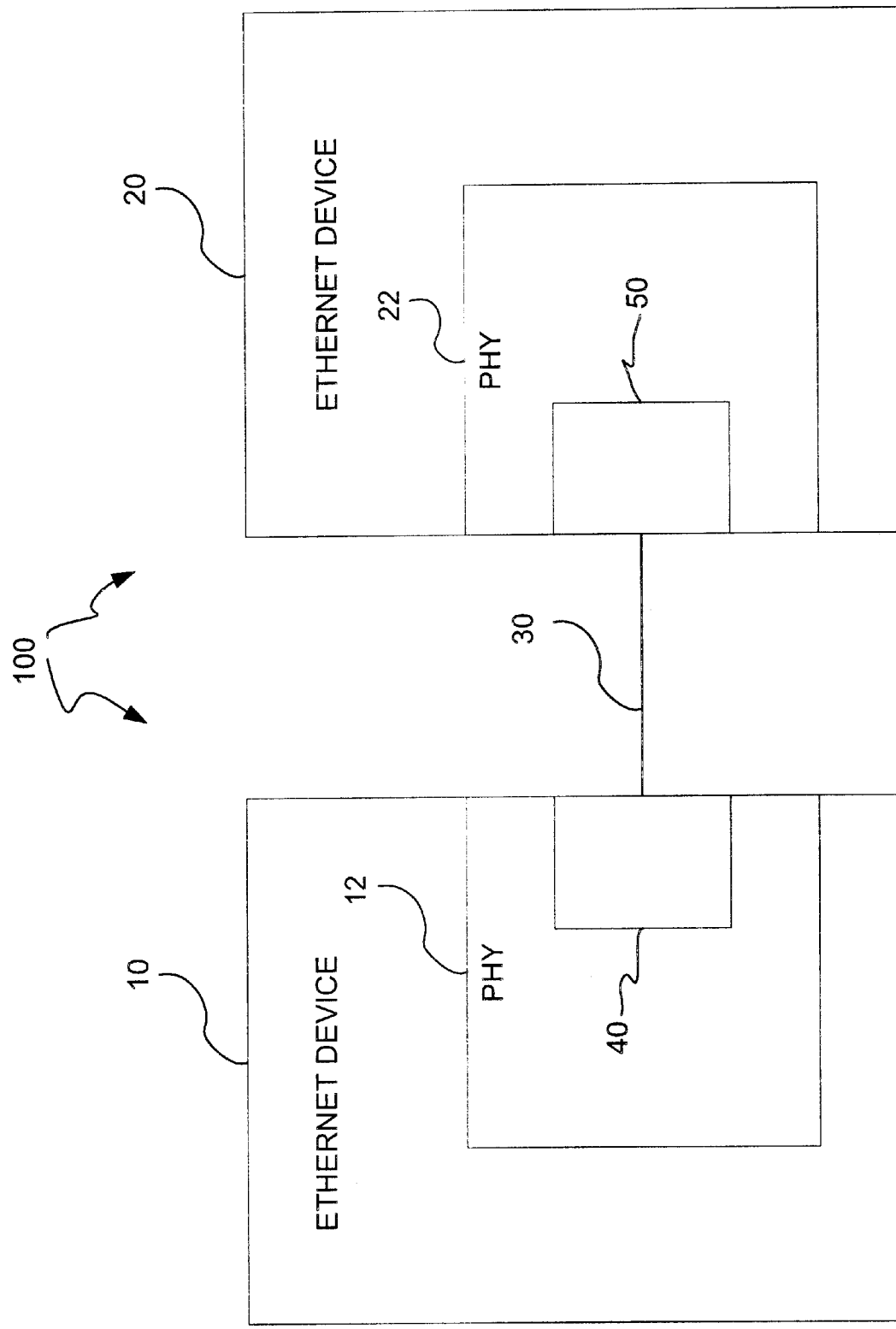
FIG. 1 is a block diagram of an Ethernet system according to the present invention.

FIG. 1 depicts an Ethernet system 100. As shown, the Ethernet system 100 includes first and second self-configuring Ethernet devices 10 and 20 interconnected by a transmission medium, such as a cable 30. The Ethernet devices 10 and 20 may comprise the same or different types of Ethernet devices. That is, the Ethernet devices 10 and 20 may comprise a pair of Ethernet end stations, a pair of Ethernet hubs, or an Ethernet end station and an Ethernet hub. As discussed above, Ethernet end stations include devices such as personal computers and printers. Moreover, the cable 30 may comprise an Ethernet crossover cable or an Ethernet straight-through cable.

Each Ethernet device 10 and 20 is illustrated as further comprising an Ethernet physical layer (PHY) 12 and 22 respectively. Further, auto-configuration devices 40 and 50 are respectively disposed between each Ethernet PHY 12 and 22 and the cable 30 to automatically configure the connection between the Ethernet PHYs 12 and 22 regardless of the type of Ethernet device or cable type. Moreover, the auto-configuration devices 40 and 50 detect the presence of a link between the devices 10 and 20 and automatically reconfigure a transmit/receive configuration of the associated devices until detecting a link between the devices. Details concerning the configuration and operation of the devices 40 and 50 are discussed below with reference to FIGS. 2 and 3.

Figure 2:
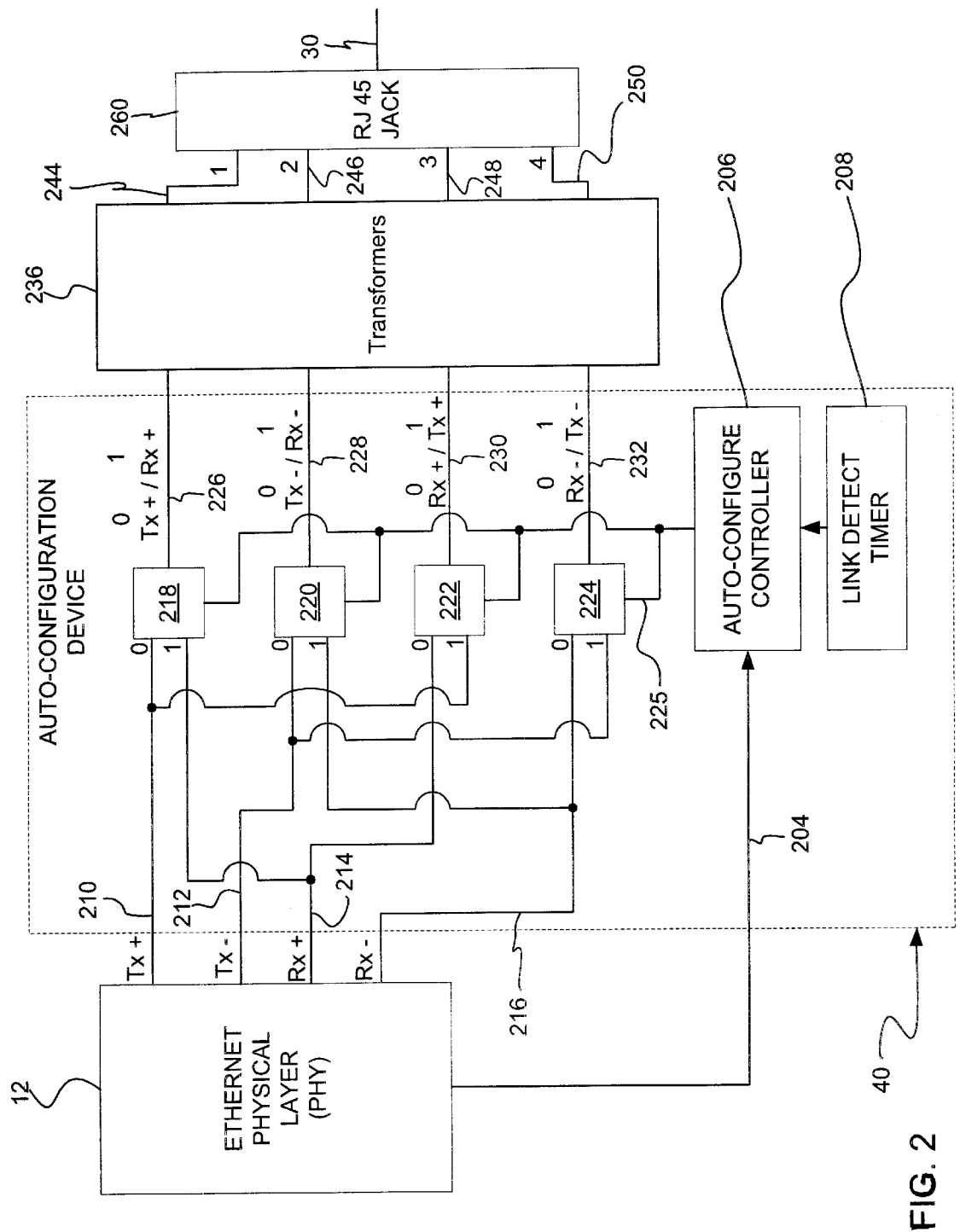
FIG. 2 is a schematic diagram illustrating details of the Ethernet physical layer and auto-configuration device illustrated in FIG. 1.

FIG. 2 illustrates details of the Ethernet PHY 12 and of the associated auto-configuration device 40. As set forth above, the Ethernet PHY 12 comprises the front end of any Ethernet device such as a personal computer, a printer, a hub, or the like. Exiting the Ethernet PHY 12 are two differential transmit lines 210 and 212, and two differential receive lines 214 and 216. That is, line 210 represents the positive transmit line Tx+, while line 212 represents the negative transmit line Tx−. Similarly, line 214 represents the, positive receive line Rx+ and line 216 represents the negative receive line Rx−.

The auto-configuration device 40 is shown as including multiplexers 218, 220, 222, and 224 for selectively switching, or reversing a transmit/receive configuration of the associated device 10. In particular, the multiplexer 218 has the positive transmit (Tx+) line 210 and the positive receive (Rx+) line 214 as inputs to its 0 and 1 ports respectively. In this configuration, when auto-configure controller 206 switches the multiplexer 218 into in the 0 position, the output of the multiplexer 218 on line 226 will be the positive transmit (Tx+) signal. Conversely, when the controller 206 switches the multiplexer 218 into the 1 position, the output of the multiplexer 218 on line 226 will be the positive receive (Rx+) signal. Thus, the output of the multiplexer 218 along line 226 can be either the positive transmit (Tx+) signal or the positive receive (Rx+) signal, depending on whether the controller 206 has switched the multiplexer 218 into the 0 position or the 1 position.

Similarly, the multiplexer 220 has the negative transmit (Tx−) line 212 and the negative receive (Rx−) line 214 as inputs to its 0 and 1 ports respectively. In this configuration, when auto-configure controller 206 switches the multiplexer 220 into in the 0 position, the output of the multiplexer 220 on line 228 will be the negative transmit (Tx−)signal. Conversely, when the controller 206 switches the multiplexer 220 into the 1 position, the output of the multiplexer 220 on line 228 will be the negative receive (Rx−) signal. Thus, the output of the multiplexer 220 along line 228 can be either the negative transmit (Tx−) signal or the negative receive (Rx−) signal, depending on whether the controller 206 has switched the multiplexer 220 into the 0 position or the 1 position.

Likewise, the multiplexer 222 has the positive receive (Rx+) line 214 and the positive transmit (Tx+) line 210 as inputs to its 0 and 1 ports respectively. In this configuration, when auto-configure controller 206 switches the multiplexer 222 into in the 0 position, the output of the multiplexer 222 on line 230 will be the positive receive (Rx+) signal. Conversely, when the controller 206 switches the multiplexer 222 into the 1 position, the output of the multiplexer 222 on line 230 will be the positive receive (Rx+) signal. Thus, the output of the multiplexer 222 along line 230 can be either the positive receive (Rx+) signal or the positive transmit (Tx+) signal, depending on whether the controller 206 has switched the multiplexer 222 into the 0 position or the 1 position.

Lastly, the multiplexer 224 has the negative receive (Rx−line) 214 and the negative transmit (Tx−) line 212 as inputs to its 0 and 1 ports respectively. In this configuration, when auto-configure controller 206 switches the multiplexer 224 into in the 0 position, the output of the multiplexer 224 on line 232 will be the negative receive (Rx−) signal. Conversely, when the controller 206 switches the multiplexer 224 into the 1 position, the output of the multiplexer 224 on line 232 will be the negative transmit (Tx−) signal. Thus, the output of the multiplexer 224 along line 232 can be either the negative receive (Rx−) signal or the negative transmit (Tx−) signal, depending on whether the controller 206 has switched the multiplexer 224 into the 0 position or the 1 position.

The auto-configuration device 40 also includes transformers 236 disposed between the multiplexers 218, 220, 222, and 224 a jack 260. Pursuant to one embodiment, the transformers 236 comprise Ethernet 10baseT transformers. As shown, the jack 260 preferably comprises a conventional RJ 45 jack. In particular, the output of the multiplexer 218 passes along line 226, through the transformers 236, and into port 1 of the jack 260 along line 244. Likewise, the output of the multiplexer 220 passes along line 228, through the transformers 236, and into port 2 of the jack 260 along line 246. Moreover, the output of the multiplexer 222 passes along line 230, through the transformers 236 and into port 3 of the jack 260 along line 248. The output of the multiplexer 224 passes along line 232, through the transformers 236, and into port 4 of the jack 260 along line 250. The cable 30 is coupled to the jack 260 as illustrated.

The auto-configure controller 206 is shown as being coupled to each of the multiplexers 218, 220, 222, and 224 via line 225. In addition, the auto-configure controller 206 is also coupled to the Ethernet PHY 12 via the line 204. The auto-configure controller 206 is also preferably coupled to a link detect timer 208. Those skilled in the art will appreciate that the auto-configure controller 206 could comprise a hardware or a software entity. Similarly, the link detect timer 208 may comprise a conventional timer circuit or timer algorithm. For reasons discussed in more detail below, the link detect timer periodically provides a time interval expiration signal to the auto-configure controller 206. Advantageously, the time interval is sufficiently long so as to permit the associated components enough time to settle. In addition, to prevent a deadlock between two devices 10 and 20 each having an auto-configuration device 40 and 50, the time interval may be randomized by the link detect timer. For example, the time interval may be randomized to select a time interval that is an integer multiple of a minimum time required for the associated components to settle.

In general, the auto-configure controller 206 controls the multiplexers 218, 220, 222, and 224 based on link indicator signals received from the. Ethernet PHY 12 via the line 204. As discussed in more detail below, the auto-configure controller 206 periodically switches the configuration of the multiplexers 218, 220, 222, and 224 between the 0 position and the 1 position until the auto-configure controller 206 receives a link indicator signal along the line 204. Details of the operation of the auto-configure controller 206 are discussed below with reference to FIG. 3.

Figure 3:
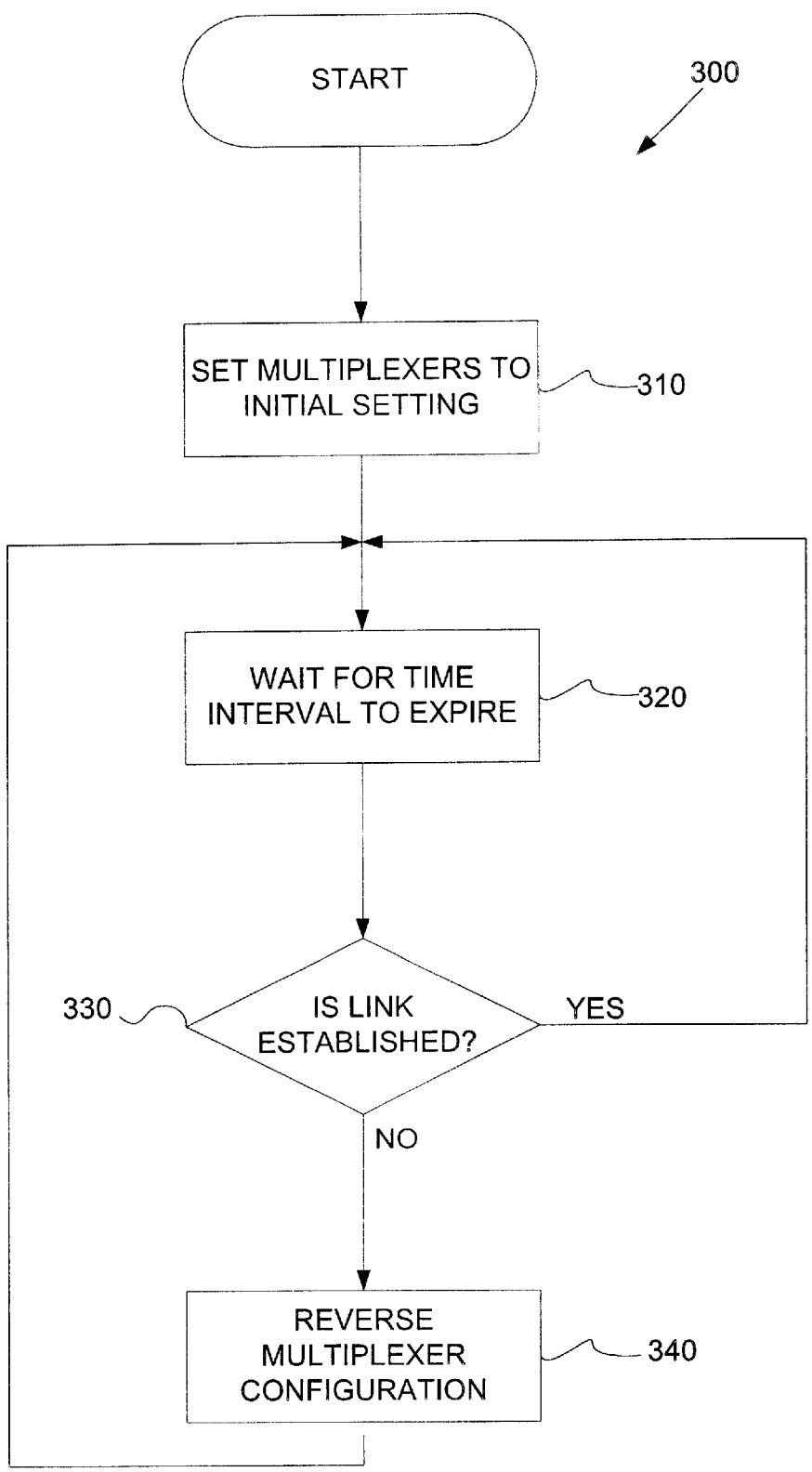
FIG. 3 is a flowchart illustrating a method of automatically configuring an Ethernet device according to the present invention.

FIG. 3 is a flowchart 300 illustrating the operation of the auto-configuration device 40 of FIG. 2. As shown, the auto-configure controller 206 initially sets the multiplexers 218, 220, 222, and 224 to an initial configuration, pursuant to block 310. In one embodiment, the initial configuration might be the "0" configuration described above. In the 0 configuration, the line 226 carries the Tx+ signal, the line 228 carries the Tx− signal, the line 230 carries the Rx+ signal, and the line 232 carries the Rx− signal.

Then, the auto-configure controller 206 waits until expiration of a predetermined time period pursuant to block 310. In one embodiment, the auto-configure controller 206 waits until it receives a time interval expiration signal from the link detect timer 208 (FIG. 2). Those skilled in the art will appreciate that the length of the predetermined time interval is preferably long enough to permit the various components of the auto-configuration device 40 to settle. Moreover, as discussed above, to prevent a deadlock between multiple auto-configuration devices, such as the devices 40 and 50, the length of the predetermined time interval is randomized to increase the likelihood that the devices 40 and 50 will not have identical predetermined time intervals, which could cause a deadlock situation with both devices switching at the same time and preventing a link from ever being established.

Once the predetermined time interval has expired, the auto-configure controller 206 determines whether a link is established between multiple devices in accordance with block 330. Pursuant to one embodiment, the auto-configure controller 206 determines whether a "link-established" signal is present on the link indicator line 204. Conventional Ethernet PHYs provide a link indicator output to which the line 204 may be connected so that the line 204 carries a link-established signal when an Ethernet connection, or Ethernet link, is established between the associated Ethernet PHY 12 and another Ethernet device, such as the Ethernet device 20 of FIG. 1.

If the auto-configure controller 206 does not detect a link-established signal on the line 204, then the determination of block 330 is "no" and execution proceeds to block 340. At block 340, the auto-configure controller 206 switches the configuration of the multiplexers 218, 220, 222, and 224 pursuant to block 340. That is, if the multiplexers 218, 220, 222, and 224 are in the 0 configuration, the auto-configure controller 206 switches them to the 1 configuration, and vice versa. In this manner, the auto-configure controller 206 periodically reverses the transmit/receive configuration of the jack 260 until the auto-configure controller 206 detects a link-established signal on the line 204.

However, if the auto-configure controller 206 does detect a link-established signal on the line 204, the determination of block 330 is "yes" and execution returns to the block 320 wherein the auto-configure controller 206 waits for the predetermined time interval to expire. Then, upon expiration of the predetermined time interval, the auto-configure controller 206 again determines, pursuant to block 330, whether a link-established signal is present on the line 204.

Accordingly, the present invention permits an Ethernet device, such as the Ethernet device 10 (FIG. 1) to be automatically configured as either an end station or as a hub without user intervention. Indeed, all the end user must do is interconnect the Ethernet device 10 with the Ethernet device 20 via the cable 30. Then, regardless of whether the Ethernet devices 10 and 20 are hubs or end stations, and regardless of whether the cable 30 is a crossover cable or a straight-through cable, the auto-configure controller 206 will detect whether an Ethernet link has been established and, if not, will periodically reverse, or switch, the transmit/receive configuration of the associated Ethernet device until a link is established.

The invention has been described above with reference to specific embodiments. It will, however, be evident that various modifications and changes may be made thereto without departing from the broader spirit and scope of the invention as set forth in the appended claims. For example, the present invention may also be employed with connectors of types other than Ethernet, such as Universal Serial Bus (USB) connectors. The foregoing description and drawings are, accordingly, to be regarded in an illustrative rather than a restrictive sense.

What is claimed is:

1. An apparatus, comprising:
    a physical layer having a plurality of leads having a configuration; and
    a configuration device to receive a signal indicative of a link, wherein the configuration device includes a plurality of multiplexers to change a first configuration of the plurality of leads to a second configuration when the configuration device does not receive the signal indicative of the link, wherein the plurality of leads includes a pair of differential transmit leads and a pair of differential receive leads, each of the plurality of multiplexers being coupled to at least one transmit lead and at least one receive lead so that the configuration of the physical layer may be selected by switching the plurality of multiplexers.

2. The apparatus of claim 1, wherein at least one transmit lead and at least one receive lead are of the same polarity.

3. The apparatus of claim 1, wherein the physical layer and the configuration device are disposed on a single chip.

4. The apparatus of claim 1, further including a controller for periodically switching the plurality of multiplexers when the configuration device does not receive the signal indicative of the link.

5. The apparatus of claim 4, further including a link detect timer coupled to the controller for triggering the controller to check for the presence of the signal indicative of the link at the expiration of a predetermined or randomized time period.

6. The apparatus of claim 5, further including an RJ 45 jack.

7. The apparatus of claim 1, further including an Ethernet device.

8. A configuration device, disposed between leads of an Ethernet physical layer and a connector, comprising:
    a first multiplexer coupled to the Ethernet physical layer for selectively receiving and transmitting a receive positive and transmit positive signal to a first transmission line, the first transmission line being coupled to the connector;
    a second multiplexer coupled to the Ethernet physical layer for selectively receiving and transmitting a receive negative and transmit negative signal to a second transmission line, the second transmission line being coupled to the connector;

a third multiplexer coupled to the Ethernet physical layer for selectively transmitting and receiving a transmit positive and receive positive signal to a third transmission line, the third transmission line being coupled to the connector;

a fourth multiplexer coupled to the Ethernet physical layer for selectively receiving and transmitting a receive negative and transmit negative signal to a fourth transmission line, the fourth transmission line being coupled to the connector; and a controller coupled to the first, second, third, and fourth multiplexers for selectively switching the associated first, second, third, and fourth transmission lines between receive and transmit configurations until detecting establishment of an Ethernet link.

9. The configuration device of claim 8, wherein the controller is coupled to the Ethernet physical layer by a link indicator line for receiving a signal indicative of an Ethernet link when an Ethernet link is present between the Ethernet physical layer and another Ethernet device.

10. The configuration device of claim 8, further including a timer coupled to the controller for periodically sending a time interval expiration signal to the controller.

11. A configuration device for coupling a device physical layer having a plurality of leads to a connector, comprising:

a plurality of multiplexers, each of the plurality of multiplexers coupled to at least one transmit lead and at least one receive lead of the plurality of leads to the connector; and a controller coupled to each of the plurality of multiplexers and coupled to the physical layer for receiving a signal indicative of the presence of a link from the physical layer and for switching the plurality of multiplexers between first and second configurations until receiving the signal indicative of the presence of a link.

12. The configuration device of claim 11, further including a timer coupled to the controller for periodically causing the controller to receive the signal indicative of the presence of the link.

13. The configuration device of claim 11, wherein the physical layer, the plurality of multiplexers, and the controller are all disposed on a single chip.

14. The configuration device of claim 11, wherein the plurality of leads of the physical layer include transmit and receive leads.

15. The configuration device of claim 11, wherein the link further includes an Ethernet link.

16. A method of configuring a transmit/receive configuration of a first device, comprising:

detecting whether a link is present between the first device and a second device;

providing a configuration device coupled to the first device for selectively reversing a transmit/receive configuration of the first device, the configuration device comprising a plurality of multiplexers, each of the plurality of multiplexers being coupled to at least one transmit lead and at least one receive lead; and reversing the transmit/receive configuration of the first device if no link is detected.

17. The method of claim 16, further including repeating the step of detecting after the step of reversing if no link is detected.

18. The method of claim 16, wherein the step of detecting further includes receiving a signal indicative of a link.

19. A method for configuring an Ethernet connector, comprising the steps of:

providing an Ethernet physical layer having a plurality of leads;

providing a plurality of multiplexers, each of the plurality of multiplexers coupled to at least one transmit lead and at least one receive lead of the plurality of leads;

coupling the plurality of leads to the connector in a first configuration;

receiving a signal indicative of whether an Ethernet link is present; and coupling the plurality of leads to the connector in a second configuration if no Ethernet link is present.

20. A method for auto-configuring an Ethernet device having an Ethernet physical layer and transmit and receive leads, the transmit and receive leads being configured in a first configuration, comprising the steps of:

providing a plurality of multiplexers, each of the plurality of multiplexers coupled to at least one transmit lead and at least one receive lead;

detecting the presence of an Ethernet link between the Ethernet device and a second device;

reversing the configuration of the transmit and receive leads if no Ethernet link is detected;

determining a randomized time period;

waiting for the randomized time period;

repeating the detecting step after the waiting step; and repeating the reversing step.

21. The method of claim 20, wherein the randomized time period includes an integer multiple of a time period required for components associated with the Ethernet physical layer to settle.

22. A system for configuring a transmit/receive configuration of a first device, comprising: means for detecting whether a link is present between the first device and a second device; and means for providing a configuration device coupled to the first device for selectively reversing a transmit/receive configuration of the first device, the configuration device comprising a plurality of multiplexers, each of the plurality of multiplexers being coupled to at least one transmit lead and at least one receive lead; and reversing the transmit/receive configuration of the first device if no link is detected.

23. A system for configuring a connector, comprising:

physical layer means having a plurality of leads;

a plurality of multiplexer means, each of the plurality of multiplexer means coupled to at least one transmit lead and at least one receive lead of the plurality of leads;

means for coupling the plurality of leads to the connector in a first configuration;

means for receiving a signal indicative of whether a link is present; and means for coupling the plurality of leads to the connector in a second configuration if no link is present.

* * * * *